Jan. 15, 1952 J. NIELSON 2,582,933
CORRUGATED SHEET METAL CUTTER
Filed March 30, 1950
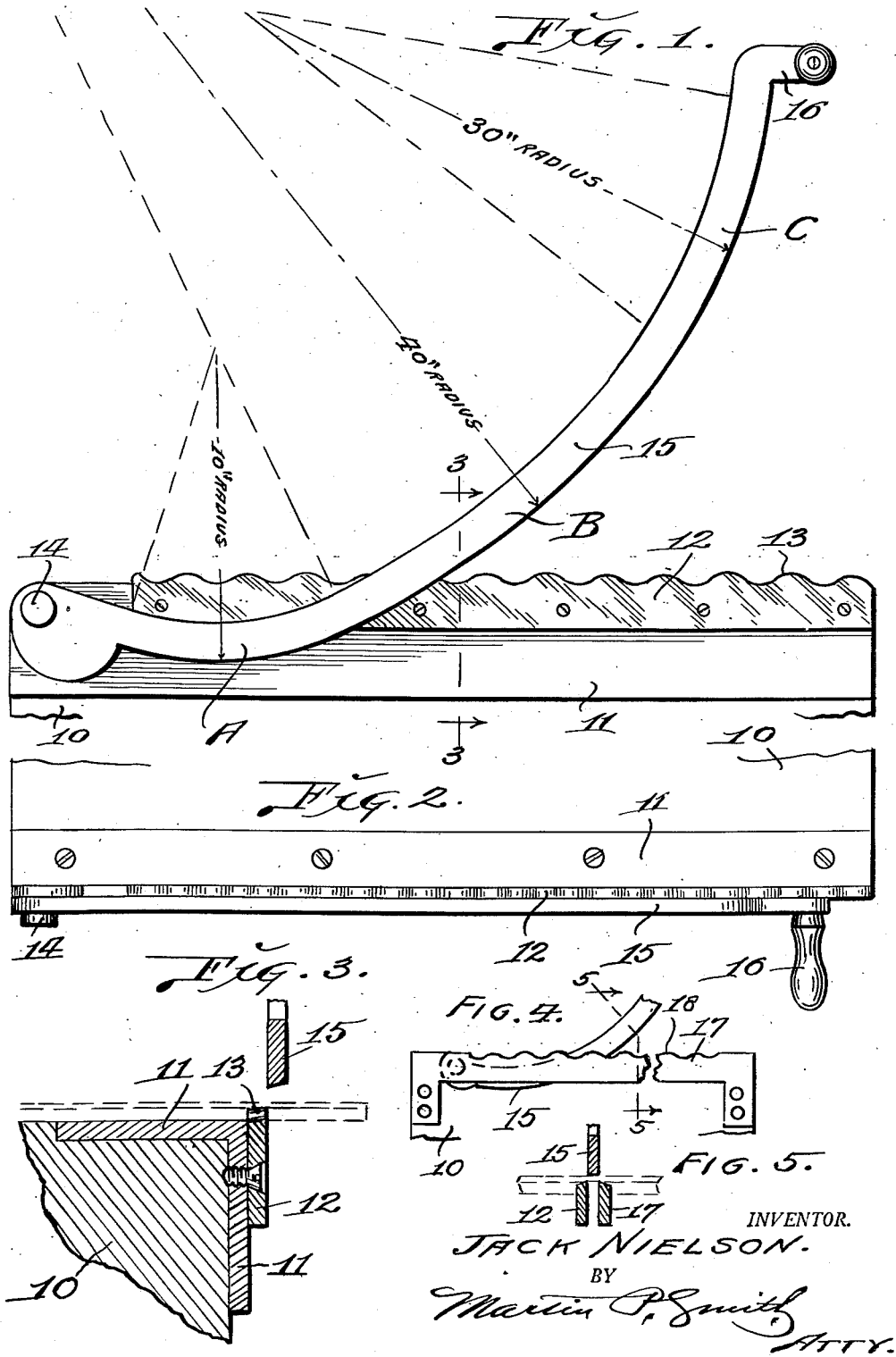
INVENTOR.
JACK NIELSON.

Patented Jan. 15, 1952

2,582,933

UNITED STATES PATENT OFFICE 2,582,933

CORRUGATED SHEET METAL CUTTER

Jack Nielson, Los Angeles, Calif.

Application March 30, 1950, Serial No. 152,793

1 Claim. (Cl. 164—44)

My invention relates to a certain hand-operated shear-like machine, particularly designed for cutting corrugated sheet metal, and the principal object of my invention is to provide a machine of the character referred to, having a fixed cutting blade, the upper edge of which is corrugated for reception of the sheet metal to be cut, and the other blade being pivoted so as to produce a practically continuous cut similar to the cutting action of the blade of a conventional sheet metal hand-operated shears, thus providing a clean continuous cut which cannot be produced by the conventional sheet metal hand-operated shears or snips.

A further object of my invention is to provide a machine of the character referred to, which operates with minimum power requirements inasmuch as the pivoted blade has a curved cutting edge designed so as to provide for the same angularity of the cutting action between the blades throughout the lengths thereof.

With the foregoing and other objects in view, my invention consists in certain novel features of construction and arrangement of parts that are hereinafter more fully described, and claimed and illustrated in the accompanying drawing, in which:

Fig. 1 is a side elevational view of a corrugated sheet metal cutter constructed in accordance with my invention.

Fig. 2 is a plan view of the cutter.

Fig. 3 is an enlarged vertical section, taken on line 3—3 of Fig. 1.

Fig. 4 is a side elevational view of a modified form of the cutter.

Fig. 5 is an enlarged cross section, taken on the line 5—5 of Fig. 4.

Referring by numerals to the accompanying drawing, which illustrates a preferred embodiment of my invention, 10 designates a table upon one edge of which is mounted an angle bar 11, and secured to the upper portion of the vertical web of said angle bar, is the fixed blade 12 of the shears, the uper edge 13 thereof being corrugated for the section of sheet metal to be cut.

Pivoted at 14, to angle bar 11, just beyond one end of the fixed blade 12, is one end of the movable blade 15, the same being irregularly curved throughout its length as hereinafter described, and the free end of this blade is provided with a handle 16.

In accordance with my invention, portion A of blade 15, the length of which portion is less than one-third of the entire length of the blade, is formed on a relatively short radius; for instance, in the average machine this radius might be approximately 10 inches.

The intermediate portion B of the movable blade, and which intermediate portion has greater length than portion A, has a radius of approximately 40 inches; and that portion C of the blade between portion B and handle 16, and which has a length of about one-third of the entire length of the blade, has a radius of approximately 30 inches, which is greater than the radius of portion A and less than the radius of portion B.

I have demonstrated, in tests and experiments, that the blade, constructed in accordance with my invention and having three different radii, provides for a continuous cut of the metal more or less similar to the action of the blades on a conventional hand shears or snips, without the repeated opening and closing of the shear blades. This advantageous result is due to the fact that the pivoted blade is curved so as to engage and cut progressively through the corrugations of the sheet metal, during which cutting operation the angularity between the curved and corrugated cutting edges remains practically the same through the lengths thereof.

In the modified construction shown in Figs. 4 and 5, a second blade 17, having a corrugated cutting edge 18, is fixedly mounted on frame 10, parallel with and in spaced relation to blade 12 and thus, pivoted blade 15 passes between the two corrugated blades, which arrangement eliminates all tendency of deformation of the sheet metal along the edges of the cut made by the pivoted blade, and a single corrugated blade on one side thereof, particularly when acting upon relatively thin corrugated sheet metal.

Thus it will be seen that I have provided a corrugated sheet metal cutting machine which is simple in construction, inexpensive of manufacture and very effective in performing the functions for which it is intended.

Minor changes in the size, form and construction of the various parts of my improved sheet metal cutting machine may be made and substituted for those herein shown and described without departing from the spirit of my invention, the scope of which is set forth in the appended claim.

I claim as my invention:

A corrugated sheet metal cutting machine, comprising a fixed blade with a cutting edge corrugated from end to end thereof and the arcuate ridges of which are tangent to a plane, a movable blade having a continuously curved cutting edge of a length equal to the length of the corrugated cutting edge of the first blade in convex relation thereto, the movable blade being pivoted to the fixed blade adjacent one end thereof and at a point beneath the lowermost point in its corrugated cutting edge, the portion of the continuously curved cutting edge adjacent said pivot having a radius of approximately 10 inches, the portion adjacent the free end thereof having a radius of approximately 30 inches, and the intermediate portion having a radius of approximately 40 inches, and the length of said free end portion being greater than that of said first portion and the length of said intermediate portion being greater than that of said free end portion whereby to provide substantially uniform angularity between the movable blade and said plane in the cutting action throughout the lengths thereof.

JACK NIELSON.

REFERENCES CITED

The following references are of record in the file of this patent:

UNITED STATES PATENTS

| Number | Name | Date |
| --- | --- | --- |
| 363,524 | Libbey | May 24, 1887 |
| 2,135,911 | Ostberg | Nov. 8, 1938 |
| 2,219,602 | Rayner | Oct. 29, 1940 |
| 2,355,320 | Nebel | Aug. 8, 1944 |

FOREIGN PATENTS

| Number | Country | Date |
| --- | --- | --- |
| 27,563 | Switzerland | Dec. 29, 1908 |
| 580,286 | France | Aug. 27, 1924 |
| 599,004 | Great Britain | Mar. 2, 1948 |